US008805068B2

(12) United States Patent
Vugdelija et al.

(10) Patent No.: US 8,805,068 B2
(45) Date of Patent: Aug. 12, 2014

(54) AUTOMATIC CLASSIFICATION AND COLOR ENHANCEMENT OF A MARKABLE SURFACE

(71) Applicant: Microsoft Corporation, Redmond, WA (US)

(72) Inventors: Milan Vugdelija, Belgrade (RS); Magdalena Vukosavljevic, Bellevue, WA (US); Djordje Nijemcevic, Belgrade (RS)

(73) Assignee: Microsoft Corporation, Redmond, WA (US)

( * ) Notice: Subject to any disclaimer, the term of this patent is extended or adjusted under 35 U.S.C. 154(b) by 7 days.

(21) Appl. No.: 13/713,827

(22) Filed: Dec. 13, 2012

(65) Prior Publication Data

US 2014/0169668 A1    Jun. 19, 2014

(51) Int. Cl.
*G06K 9/00* (2006.01)
*G06K 9/46* (2006.01)
*G06K 9/66* (2006.01)

(52) U.S. Cl.
USPC .......................................... 382/165; 382/190

(58) Field of Classification Search
USPC ......... 382/162, 164, 165, 173, 190, 203, 224, 382/243; 345/619, 647
See application file for complete search history.

(56) References Cited

U.S. PATENT DOCUMENTS

| | | | |
|---|---|---|---|
| 6,208,758 B1 * | 3/2001 | Ono et al. ..................... | 382/190 |
| 7,224,847 B2 | 5/2007 | Zhang et al. | |
| 7,260,278 B2 | 8/2007 | Zhang et al. | |
| 7,397,504 B2 | 7/2008 | Cutler | |
| 7,724,947 B2 | 5/2010 | Forutanpour | |
| 7,724,953 B2 | 5/2010 | Li et al. | |
| 7,952,595 B2 * | 5/2011 | Schiwietz et al. ............ | 345/647 |
| 2007/0230810 A1 * | 10/2007 | Kanatsu ........................ | 382/243 |
| 2009/0092322 A1 | 4/2009 | Erol et al. | |
| 2011/0069180 A1 | 3/2011 | Nijemcevic et al. | |
| 2012/0050302 A1 | 3/2012 | Dedeoglu et al. | |

OTHER PUBLICATIONS

Fakih et al., "Real-Time Whiteboard Capture System", IOSR Journal of Electrical and Electronics Engineering (IOSRJEEE), Aug. 2012, pp. 21-25, ISSN: 2278-1676 vol. 2, Issue 1 (Jul.-Aug. 2012).
Dickson et al., "Whiteboard Content Extraction and Analysis for the Classroom Environment", Dec. 17, 2008, in Tenth IEEE International Symposium on Multimedia, ISM, 6 pages.

(Continued)

*Primary Examiner* — Amir Alavi
(74) *Attorney, Agent, or Firm* — Steve Spellman; Peter Taylor; Micky Minhas

(57) ABSTRACT

Architecture that automatically computes if a quadrangular object captured in a given image is or is not a markable board (e.g., a whiteboard, green board, chalkboard, etc.). The markable board has a surface on which marks can be applied using chalk, ink, dry ink, or any other suitable marking instrument or tool for the given surface. The imaged quadrangular object can be defined as having a background image and a foreground image. The background image is representative of a markable board with no applied surface marks and the foreground image comprises all discernible marks applied to the board surface, but does not include the background image. A set of performance-friendly features is received and processed by a machine-learning classifier to compute if the given quadrangular object is a markable board. Thereafter, if the given image is determined to be a markable board, image enhancement is performed.

20 Claims, 11 Drawing Sheets

(56) References Cited

OTHER PUBLICATIONS

Zhang et al., "Whiteboard Scanning and Image Enhancement", available online Jun. 15, 2006, published Mar. 2007, in the proceedings of Digital Signal Processing, pp. 414-432, vol. 17, Issue 2.
"International Search Report & Written Opinion for PCT Application No. PCT/US2013/075162", Mailed Date: Mar. 7, 2014, Filed Date: Dec. 13, 2013, 13 pages.
Oliveira, et al., "Improving the Border Detection and Image Enhancement Algorithms in Tableau", Image Analysis and Recognition, Jun. 25, 2008, pp. 1111-1121.
Oliveira, et al., "Generalizing Tableau to Any Color of Teaching Boards", In IEEE 20th International Conference on Pattern Recognition 2010, Aug. 23, 2010, pp. 2411-2414.
Sila, et al., "Automatic Content Recognition of Teaching Boards in the Tableau Platform", In IEEE 21st International Conference on Pattern Recognition, Nov. 11, 2012, pp. 645-648.

* cited by examiner

AUTOMATIC CLASSIFICATION AND COLOR ENHANCEMENT OF A MARKABLE SURFACE

BACKGROUND

Image capture capabilities abound in many current user devices such as smart phones and tablets, for example. Thus, users can capture images of almost anything. While this basic capability is useful for most users, a challenge then is to utilize device hardware capabilities to the fullest extent to improve image capture and detection in the desired ways. Rather than hand-write information as is commonly used, it becomes useful and more efficient to simply take a picture of the desired content, such as of a business card, notes of others on paper, drawings on boards, and so on. However, thereafter, some recognition technique is typically employed to process the captured information into a more useable form. There is a continually evolving development effort to improve the usefulness of such image capture devices especially in the discrimination of the objects being captured.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture automatically computes if a quadrangular object captured in a given image is or is not a markable board (e.g., a whiteboard, green board, chalkboard, on which a user can apply marks such as lines, text, etc.), the markable board having a surface on which marks can be applied using chalk, ink, dry ink, or any other suitable marking instrument or tool for the given surface. For example, white chalk is used to apply erasable marks on black and green chalkboards, and dry ink markers are used to apply erasable marks on whiteboards (also commonly referred to as marker boards).

The imaged quadrangular object can be defined as having a background image and a foreground image. The background image is representative of the markable board with no applied surface marks (e.g., the background image is of a blank board, but can be of any color uniform across the surface such as such as white, green, black, etc.). The foreground image comprises all discernible marks applied to the board surface, but does not includes the background image.

A set of performance-friendly features is received and processed by a machine-learning classifier to compute if the given quadrangular object is a markable board. Thereafter, if the given image is determined to be a markable board, image enhancement is performed so that the background image is processed to be uniform on places where there are no marks, regardless of lighting/shadow variations over the board surface. Additionally, image enhancement performs a saturation boost on the foreground (marks) so that the objects drawn on the markable board appear crisp and clear.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
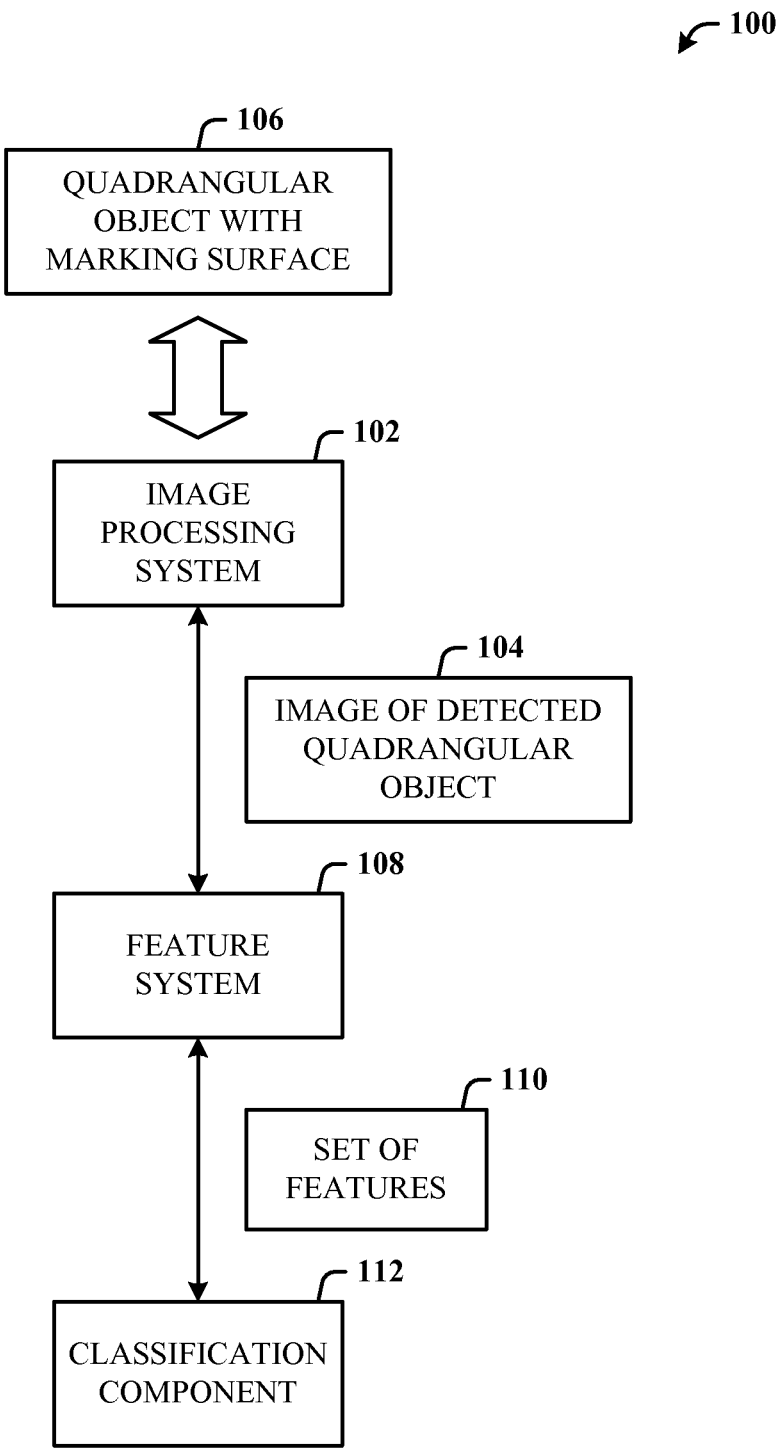
FIG. 1 illustrates a system for automatic classification of a markable board in accordance with the disclosed architecture.

The disclosed architecture automatically computes if a given image of a quadrangular object is or is not a markable board (e.g., a whiteboard). A set of features are received and processed by a machine-learning classifier to assist in computing, in one specific implementation, if the given quadrangular object is a whiteboard. Image enhancement is performed so that the background is made uniform on places where there are no marks applied, regardless of lighting/shadow variations over the markable board (surface). Additionally, image enhancement performs a saturation boost on the foreground (applied marks) so that the marks drawn on the board appears crisp and clear.

Numerous numeric features of the detected object are derived and processed to make the distinction between the markable board (e.g., whiteboard) and similar quadrangular objects that user may want to photograph such as posters, billboards, business cards, etc. Features include but are not limited to optical axis orientation, estimated distance from the camera to the object, estimated size of a real object, aspect ratio of an object on a rectified image, total size of several largest 8-connected components on a mask image, standard deviation of tile image's value channel and saturation channel, mean value of tile image's saturation channel, mean value of tile image's value and saturation channel after applying a high-pass filtering, estimated stroke width on the ink image, and area of an object that is covered with intervals (strokes) of approximately median size.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 for automatic classification of a markable board in accordance with the disclosed architecture. The system 100 can include an image processing system 102 that provides an image 104 of a quadrangular object 106 having a marking surface, and detects that the image 104 is of a quadrangular object. A feature system 108 obtains a set of features 110 related to image capture of the quadrangular object 106 for detection of a background image and a foreground image of the marking surface. A classification component 112 performs classification of the quadrangular object (using the image) based on the features 110 to determine if the quadrangular object is a markable board.

The image processing system 102, feature system 108 and classification component 112 can all be part of a device such as a camera, phone camera, portable computer camera, tablet computer, etc., that operates to capture images (videos). The user points the camera at the object 106 and takes a picture. The system 100 then facilitates the classification of the object as a markable board, such as a whiteboard, chalkboard, and the like. The image processing system 102 analyzes the object 106 and determines that the object is quadrangular. Thus, the detected quadrangular object is a candidate object for having a markable surface and then being a whiteboard.

Figure 2:
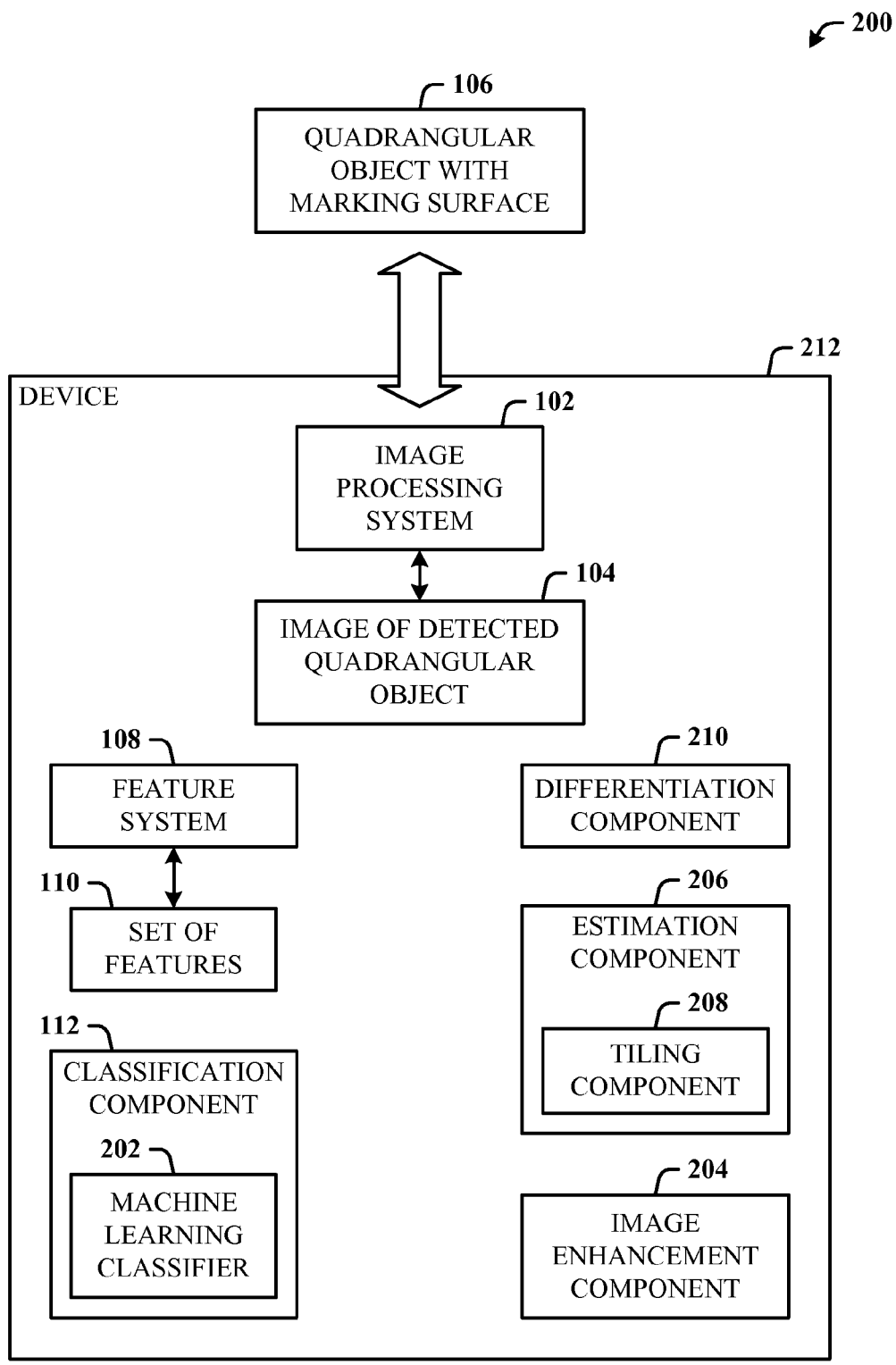
FIG. 2 illustrates an alternative system for automatic classification of a markable board and image enhancement.

FIG. 2 illustrates an alternative system 200 for automatic classification of a markable board and image enhancement. The system 200 includes the framework of system 100, in addition to other components for tiling, estimation, image enhancement, differentiation, for example. The description of this system 200 is in terms of the markable board (have the markable surface) being a whiteboard commonly known and used, and on which dry ink is applied to make marks such as text and drawings, and in several different colors (e.g., red, green, brown, blue, etc.).

In this whiteboard context, the disclosed architecture (the system 100, system 200) automatically compute if a given image of a quadrangular object and previously determined to be a quadrangular object, is or is not a whiteboard. Generally, the set of performance-friendly features 110 are received and processed by the classification component 112 using a machine-learning classifier 202 to compute if the given quadrangular object 106 (via the image 104) is a whiteboard.

Thereafter, if the given image 104 is a whiteboard, image enhancement is performed by an image enhancement component 204 so that the background becomes uniform (e.g., an approximation of the base color of the whiteboard) on places where there is no marker ink, regardless of lighting/shadow variations over the whiteboard. Additionally, the image enhancement component 204 performs a saturation boost on the foreground (that includes the marker ink) so that the markings drawn on the whiteboard appear crisp and clear.

It is to be understood that even without any marks (ink) on the board surface, the whiteboard will likely not have the uniform background color due to lighting variations across the length of the board surface (e.g., one side may be closer to a window than the other, thereby being brighter than the end farther away from the window) and shadows cast by other objects (e.g., curtains, a hanging object, etc.).

The image of an empty (unmarked) physical whiteboard is defined as the whiteboard's background image. After writing some text or sketching drawings on the whiteboard surface, and re-capturing the whiteboard image, it is assumed the same (background) color exists on places (areas of the board surface) not touched by the ink (if the environment conditions have not changed).

The description begins where the entire input image is rectified and comprises only the quadrangular object of interest and no other objects (e.g., pictures hanging on a wall next to the board, etc.). Existing techniques can be employed for object detection and perspective rectification.

The markable surface classification (e.g., whiteboard/non-whiteboard) and the image enhancement phase share common steps. The process includes estimating the background image from an image of a whiteboard with ink on it using an estimation component 206.

Figure 3:
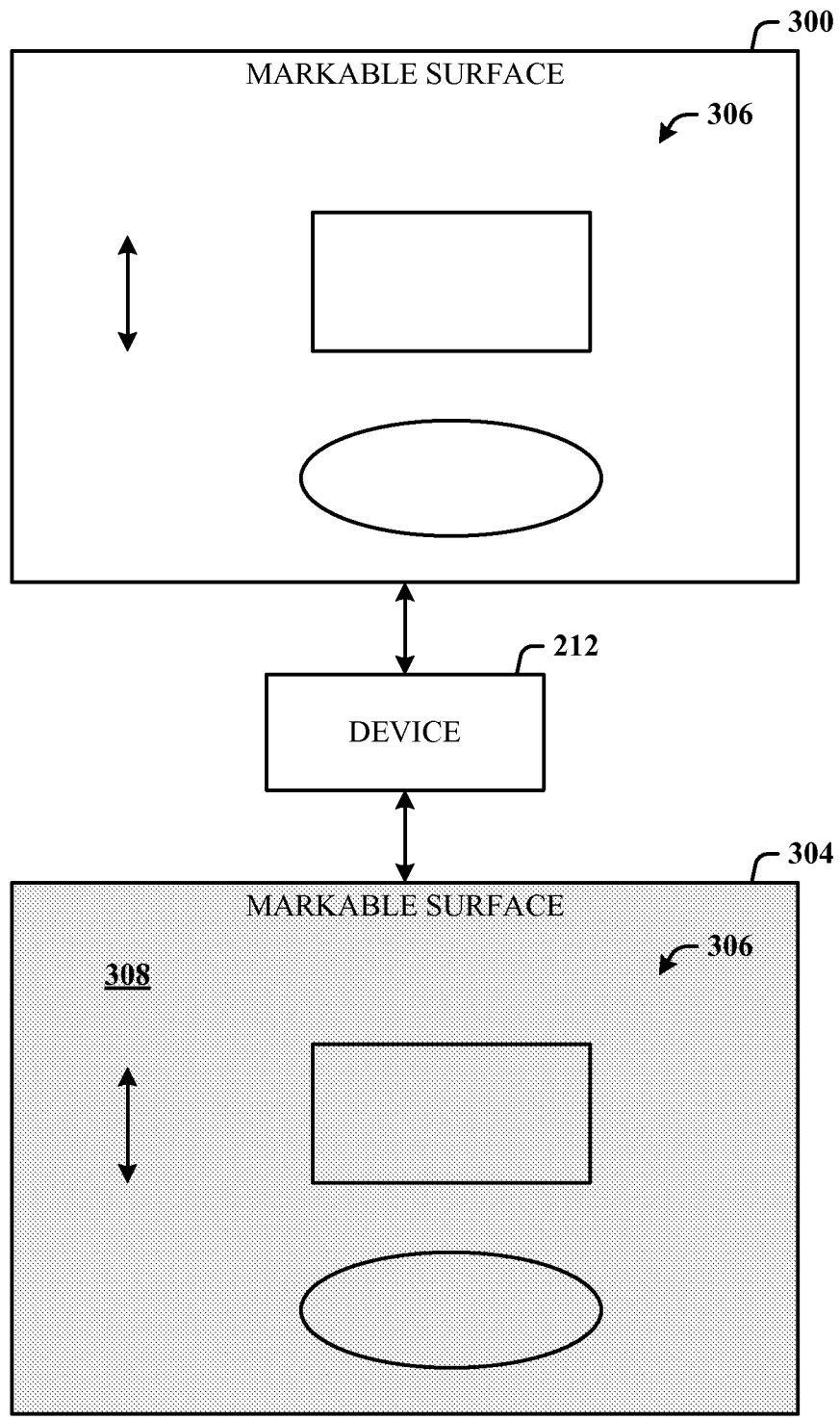
FIG. 3 illustrates an example of a physical markable board having a markable surface and as captured as an original image.

FIG. 3 shows an example of a physical markable board 300 having a markable surface 302 and as captured as an original image 304 (of a markable board such as a whiteboard). The physical markable board 300 shows marks 306 applied using chalk, dry ink, or other suitable applicators for the given board 300. In this example, where the board 300 is a whiteboard, the surface color of the physical board 300 approximates white. However, the markable surface may be perceived in the real world as off-white (approximately white) due to shadows and other lighting variations across the board 300. The imaging system (e.g., the image processing system 102) of the device 212 may then capture and process the lighting variations as the off-white background color 308 in the original image 304, as averaged across the many possible shades received into the imager of the image processing system.

Figure 4:
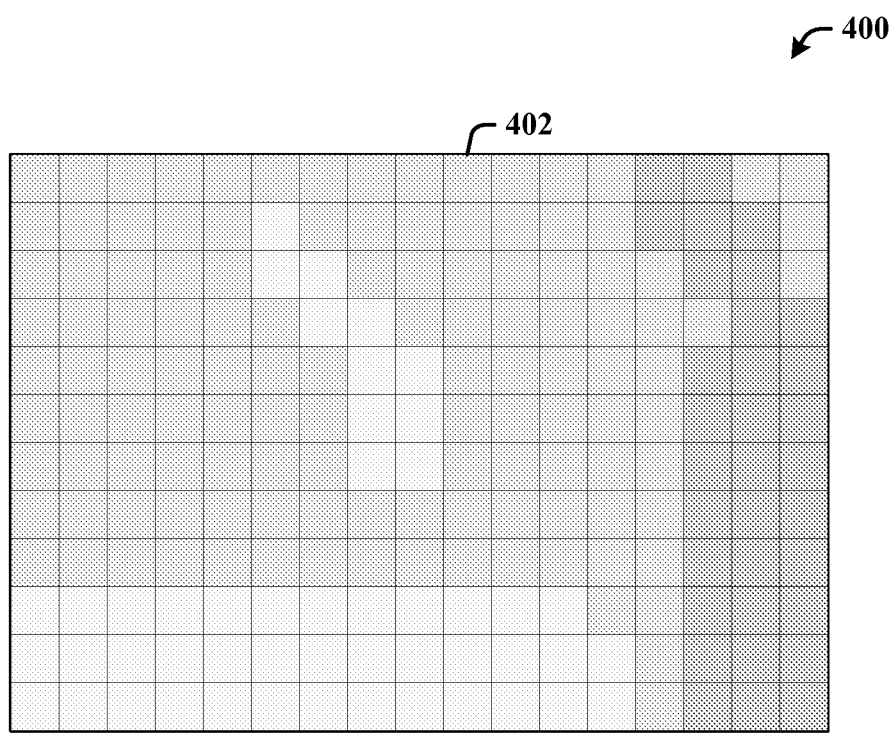
FIG. 4 illustrates an example of a tile image.

With respect to estimation, the estimation component 206 can comprise a tiling component 208 that subdivides the whiteboard (original) image into tiles (a tile image) sufficiently small (optimized size) so the background color across the tiles can be considered to exhibit some degree of color uniformity (e.g., semi-uniform), but sufficiently large so that it can be assumed the majority of pixels within each tile are not touched by the marking material (e.g., dry ink). FIG. 4 shows an example of a tile image 400. The tile image 400 shows individual tiles 402 of varying colors or shades due to the lighting variations captured and that may typically occur in a commonly-used setting.

Figure 5:
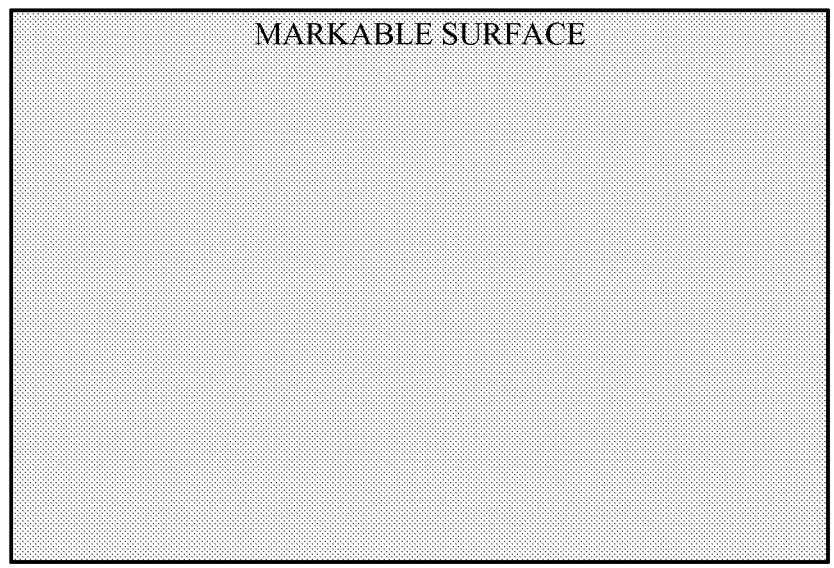
FIG. 5 illustrates a background image as derived from tiling and estimation.

The tile size can be estimated empirically. For example, the detected quadrangular object image (also referred to as the original image) can be subdivided into n×m tiles of the same size. Thus, tile height is n times smaller than the image height, and tile width is m times smaller than the image width. A temporary image, a tile image, is created of size n×m so that each pixel in the image corresponds to one tile from the original image. The color of that pixel can be computed as a median luminance value of all the pixels from the corresponding tile. The tile image 400 is much smaller in size than the original image, since the tile size is much larger than 1×1 pixels. By enlarging the tile image to the size of the original image, and using spatial interpolation, a good estimate of the whiteboard's background image (color) can be obtained. FIG. 5 illustrates a background image 500 as derived from tiling and estimation.

Figure 6:
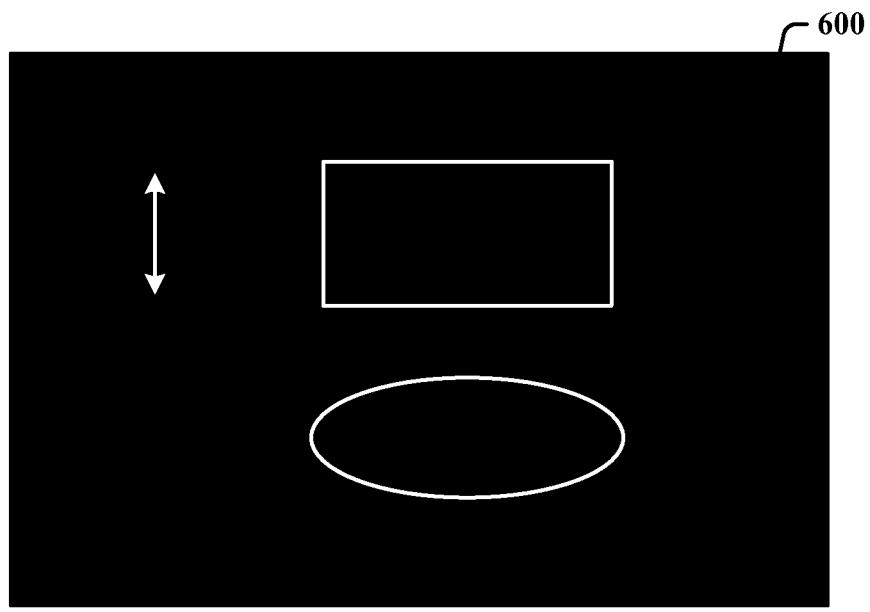
FIG. 6 illustrates an ink image where white pixels denote the foreground and black pixels denote the background.

The luminance of the ink applied to the marking surface is expected to be significantly different than the background color around it for user visibility purposes. Therefore, a differentiate component 210 can employ a technique such as a binary thresholding technique (for image segmentation based on a threshold value, e.g., mean or median value) to separate (differentiate) the ink markings of the foreground from the background (color). All pixels from the original image with a color significantly different than the pixel value in the original image can be assumed to be foreground pixels. FIG. 6 shows an ink image 600, where white pixels denote the foreground and black pixels denote the background. Here, the marks applied to the board surface are in white, the background is in black. To determine whether a quadrangular object detected in an image is or is not a whiteboard, the object's tile image can be converted to an HSV (hue saturation value) format.

Figure 8:
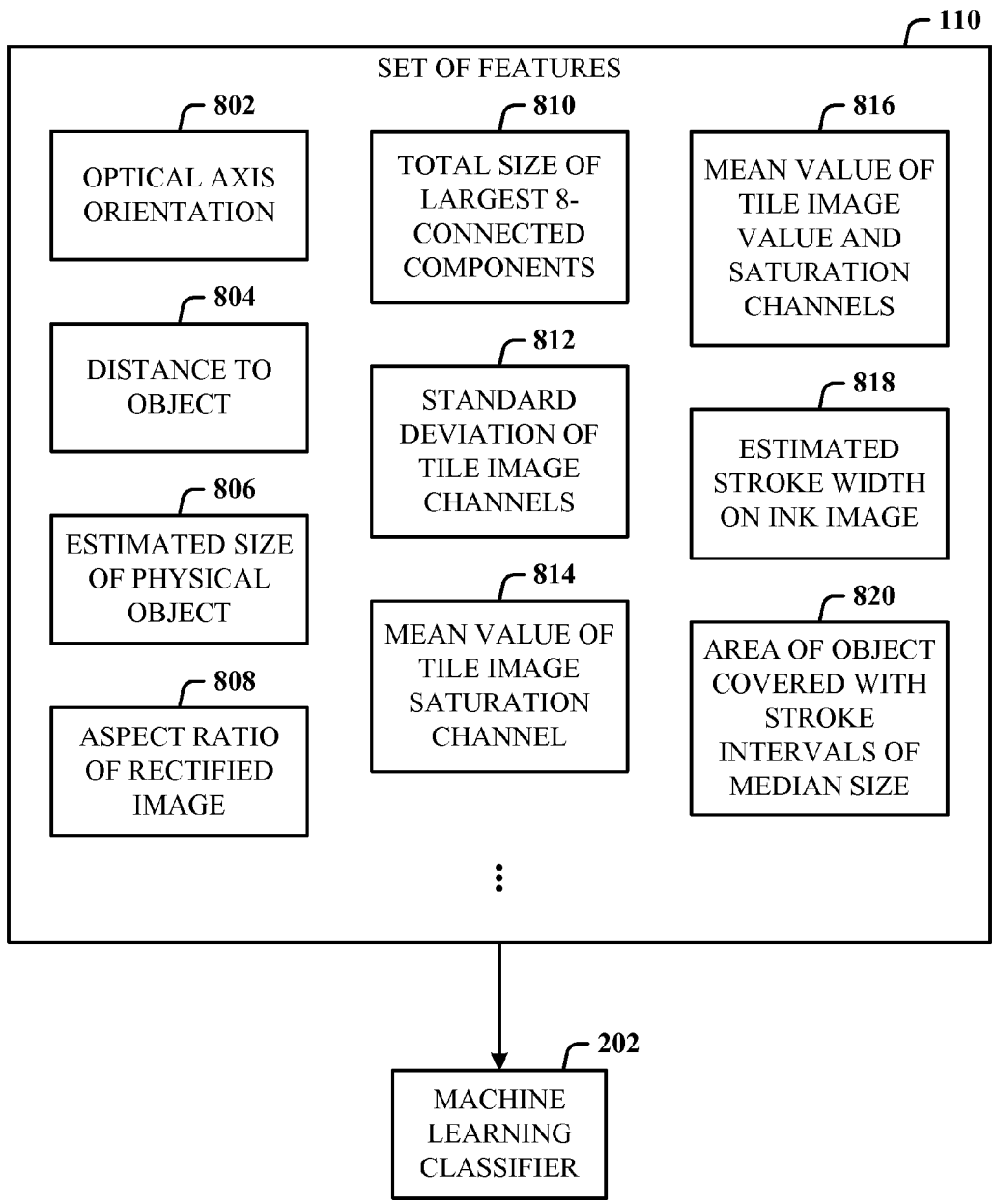
FIG. 8 illustrates a system where the set of features can be obtained and input to the machine learning classifier to distinguish a whiteboard from similar quadrangular objects.

Numeric features of the detected object are obtained and computed so that feature values assist in making a distinction between the whiteboard and similar quadrangular objects that user may want to photograph, such as posters, billboards, business cards, etc. FIG. 8 illustrates a system 800 where the set of features 110 (numeric) can be obtained and input to the machine learning classifier 202 to distinguish a whiteboard from similar quadrangular objects.

A feature 802 is the optical axis orientation, which relates to when a user takes a photo of a whiteboard, the optical axis is usually horizontal; while for a small object on a table in front of the user (e.g., a business card), the optical axis is directed downwards, and so on. The optical axis can be computed by reading the acquisition device's orientation sensor such as an accelerometer, gyroscope, tilt meter, and so on.

A feature 804 is the distance to the object, which can be estimated based on parameters obtained from an auto-focus system of the camera. The estimated object distance assists in differentiating difference between near objects (e.g., less than three meters from the camera) and far objects (e.g., three or more meters from the camera) such as a whiteboard.

A feature 806 is the estimated size of the physical (real) object, which can be obtained knowing the estimated distance and size of an object in the image, as well as camera parameters.

A feature 808 is the aspect ratio of the object on a rectified image. A feature 810 is the total size of several largest 8-connected components on a mask image. If the object represents a whiteboard, the size of the connected components on the ink image 600 can be small, while for objects such as posters and similar objects the size of the connected components is significantly larger.

A feature 812 is the standard deviation of tile image's value channel and saturation channel. If the object is a poster with possibly large areas of different colors, the deviation will be large; whereas for a whiteboard, the deviation will be small.

A feature 814 is the mean value of tile image's saturation channel. Since whiteboards are predominantly white, color saturation will be low, and for colored objects, the color saturation will be high.

A feature 816 is the mean value of tile image's value and saturation channel, after applying a high-pass filter on the channels. No rapid changes of color are expected on a whiteboard; thus, values should be low after high-pass filtering. Contrariwise, the values of on multicolored objects after high-pass filtering will be higher.

A feature 818 is the estimated stroke width on the ink image (in the case of the markable board being a whiteboard). Along each horizontal line of the ink image, intervals of foreground color and background color can be detected. For every foreground interval, the length is computed from one foreground mark to the next foreground mark. Ultimately, the number of times each length occurred on the ink image is computed, as well as the median length. This can be performed for vertical lines of the ink image 600 as well. The minimum of these median lengths is then computed. In case of a whiteboard, the lesser of the two median lengths approximately corresponds to the stroke width, and is relatively small; otherwise, the value is usually much larger.

A feature 820 is the area of an object that is covered with intervals (strokes) of approximately median size. Using previous calculations, it can be determined how much of an object is covered with strokes of lengths within a certain range around a median length. For whiteboards, this value is small, and for printed material the value can be large.

Figure 7:
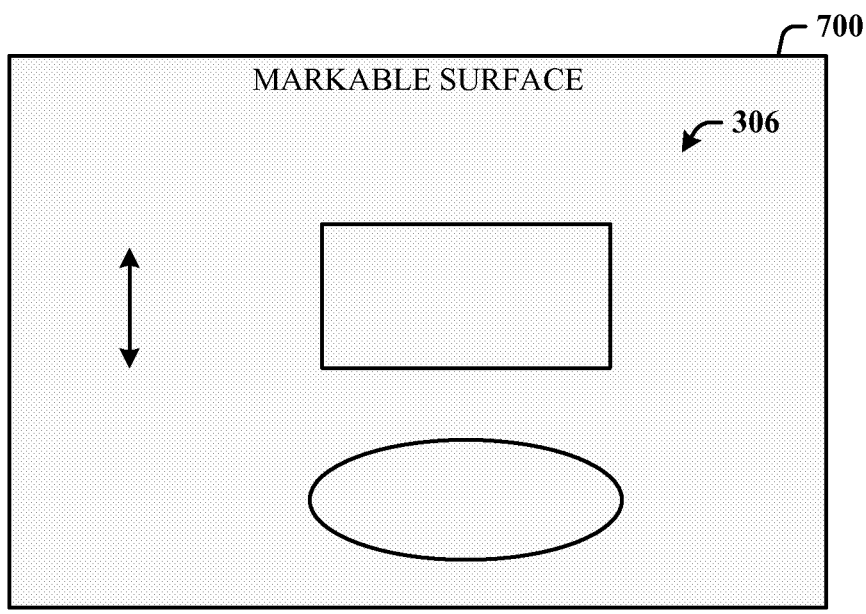
FIG. 7 illustrates the final image of the whiteboard photographed in FIG. 3.

The aforementioned numeric features 110 can be input to the machine learning classifier 202 (e.g., a neural net), which then serves as the object classifier to suggest if an input object represents or does not represent a whiteboard. FIG. 7 shows the final image 700 of the whiteboard photographed in FIG. 3. The background image may not be pure white due to the captured lighting variations across the surface. Here, the background color is not the color of white perceived in the physical markable board 300 of FIG. 3; however, it is sufficiently close and distinguishable from the foreground that the user can perceive the applied marks 306.

The disclosed architecture performs image enhancement. An enhanced image can be obtained by creating a new image and, (1) copying a pixel from the source image, whenever the corresponding mask (the ink image) pixel is white, and (2) using a constant color (e.g., white) whenever the corresponding mask pixel is black. Additionally, (1) can be augmented by increasing the source pixel's saturation before writing it into destination image. If dealing with a color image (and not a grayscale image), than additional signals can be used such as the saturation channel of the input image (repeating the procedure described) to compute greater background/foreground separation when color ink is applied to the whiteboard. Finally, ink images from both luminance and saturation channels can be joined into one image.

In other words, the set of features 110 include distance of the imaging system (camera) to the quadrangular object (feature 804) based on an auto-focus subsystem of a camera and estimated stroke width of a mark on the marking surface (feature 818). The classification component 112 classifies the marking surface as a whiteboard based on features (the set of feature 110) that distinguish the whiteboard from other quadrangular objects.

The system 200 can further comprise the machine learning classifier 202 as part of the classification component 112 that processes the set of features 110 to determine if the quadrangular object 106 is a markable board. The system 200 can further comprise the image enhancement component 204 that creates a new image and, enhances color uniformity of the background image and enhances clarity of marks in the foreground image in the new image based on the quadrangular object being a markable board.

The system 200 can further comprise the estimation component 206 that estimates the background image using spatial interpolation, and the tiling component 208 that subdivides the image of the quadrangular object into tiles, the size of which is optimized based on a color uniformity property and non-marked area property. The system 200 can further comprise the differentiation component 210 that differentiates a mark on the marking surface from the background image.

The system 200 illustrates a device 212 such as a cell phone, portable computer, tablet computer, etc., that employs a camera system and supporting resources to facilitate the disclosed architecture. Accordingly, the device 212 can include the elements/components of the system 100 of FIG. 1, or as shown in FIG. 2, such as the image processing system 102 that outputs the image 104, the feature system 108 and derived set of features 110, the classification component 112 and machine learning classifier 202, the differentiating component 210, the estimation component 206 and tiling component 208, and the image enhancement component 204.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
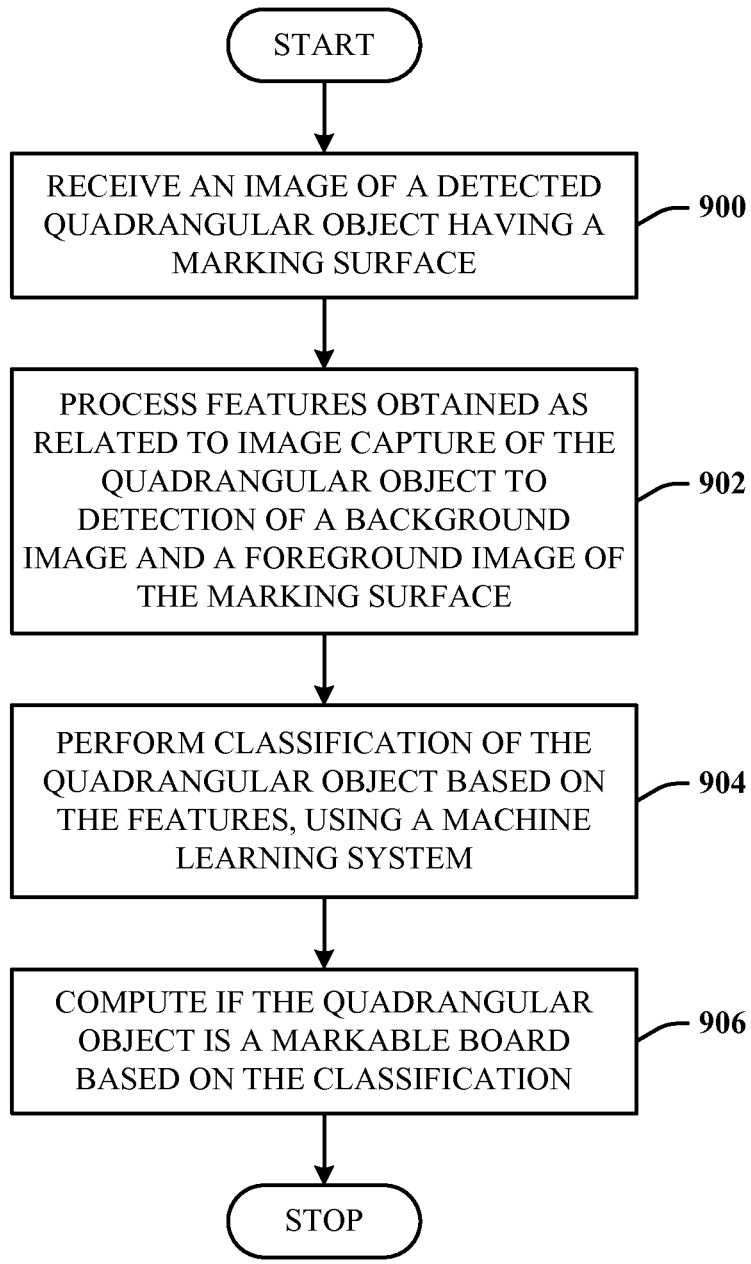
FIG. 9 illustrates a method in accordance with the disclosed architecture.

FIG. 9 illustrates a method in accordance with the disclosed architecture. At 900, an image is received of a detected quadrangular object having a marking surface. At 902, features obtained as related to image capture of the quadrangular object are processed for detection of a background image and a foreground image of the marking surface. At 904, classification of the quadrangular object is performed based on the features, using a machine learning system. At 906, computing if the quadrangular object is a markable board based on the classification.

The method can further comprise an act of estimating color of the background image by subdividing the image of the marking surface into tiles of a size that exhibit a color uniformity property and non-marked area property. The method can further comprise an act of applying a binary threshold algorithm that discerns marks on the marking surface from the background color. The method can further comprise an act of computing that the quadrangular object is a whiteboard.

The method can further comprise an act of computing a feature that is distance to the quadrangular object to a device that captures the image based on parameters related to autofocusing of the device. The method can further comprise an act of computing a feature that estimates a stroke length of a mark in an ink image. The method can further comprise an act of creating a new image of the quadrangular object for image enhancement. The method can further comprise an act of enhancing the new image to view marks in the foreground image.

Figure 10:
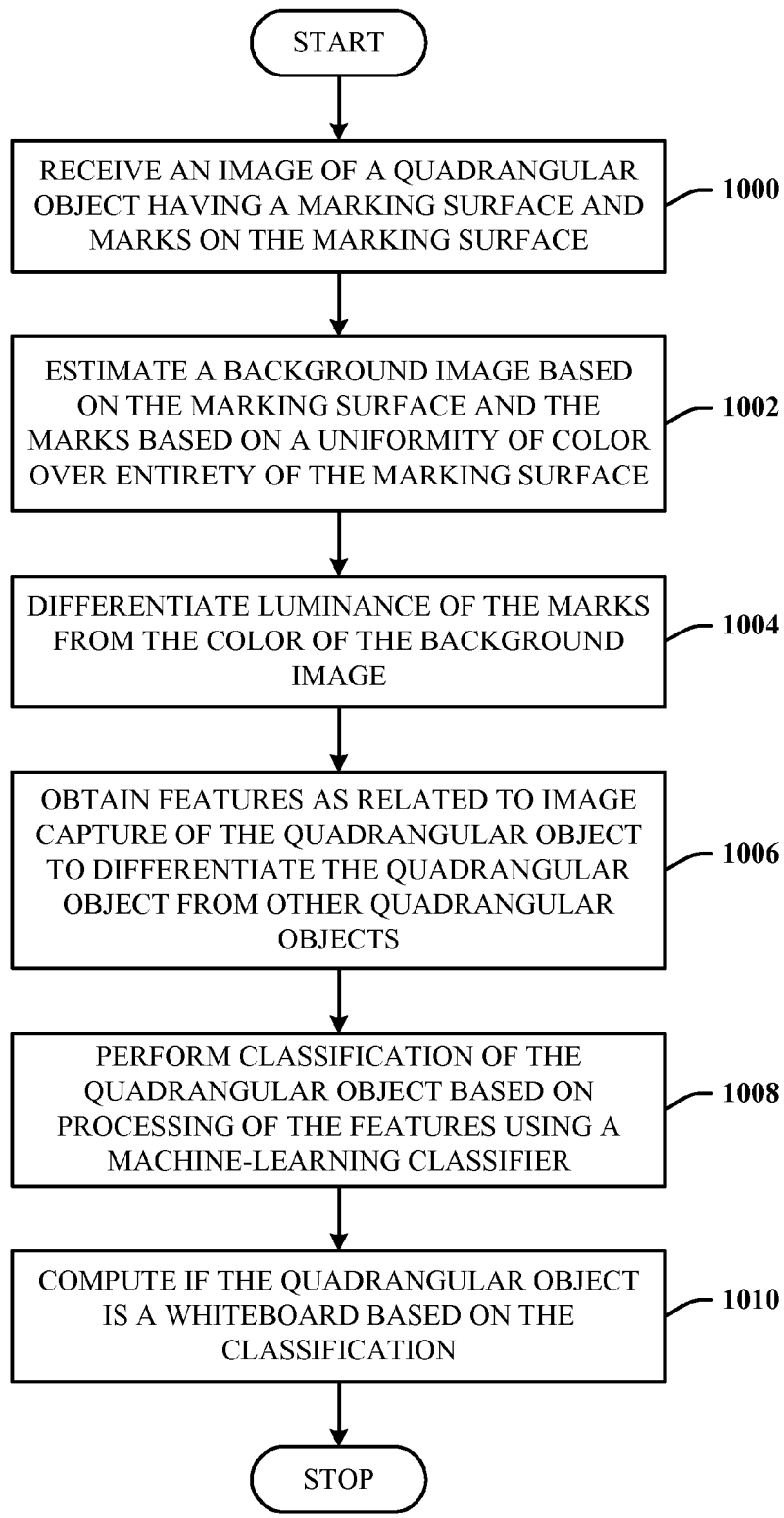
FIG. 10 illustrates an alternative method in accordance with the disclosed architecture.

FIG. 10 illustrates an alternative method in accordance with the disclosed architecture. At 1000, an image is received of a quadrangular object having a marking surface and marks on the marking surface. At 1002, a background image is estimated based on the marking surface and the marks based on a uniformity of color over entirety of the marking surface. At 1004, luminance of the marks is differentiated from the color of the background image. At 1006, features are obtained as related to image capture of the quadrangular object to differentiate the quadrangular object from other quadrangular objects. At 1008, classification of the quadrangular object is performed based on processing of the features using a machine-learning classifier. At 1010, it is computed if the quadrangular object is a whiteboard based on the classification.

The method can further comprise enhancing uniformity in the color of the background image and according to a base color of the whiteboard, and boosting saturation of the marks in a foreground image for clarity. The method can further comprise creating an enhanced image, copying a pixel from the image when a mask pixel is white and using a constant color when the mask pixel is black. The method can further comprise processing features related to camera orientation relative to the quadrangular object, camera distance from the quadrangular object, and estimated stroke width of the marks.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage medium), a module, a thread of execution, and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 11:
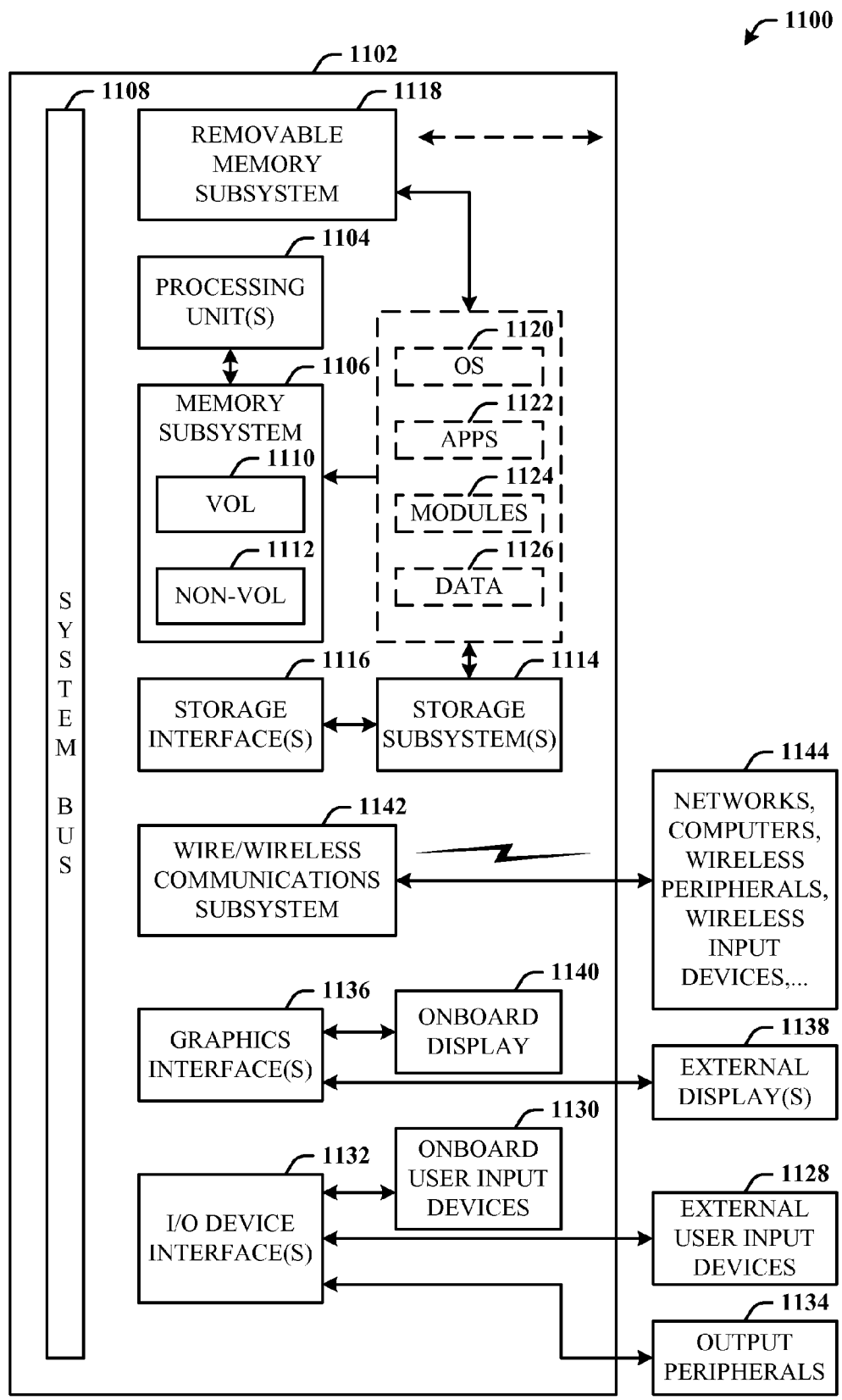
FIG. 11, there is illustrated a block diagram of a computing system that executes automatic markable board classification and color enhancement in accordance with the disclosed architecture.

Referring now to FIG. 11, there is illustrated a block diagram of a computing system 1100 that executes automatic markable board classification and color enhancement in accordance with the disclosed architecture. However, it is appreciated that the some or all aspects of the disclosed methods and/or systems can be implemented as a system-on-a-chip, where analog, digital, mixed signals, and other functions are fabricated on a single chip substrate.

In order to provide additional context for various aspects thereof, FIG. 11 and the following description are intended to provide a brief, general description of the suitable computing system 1100 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1100 for implementing various aspects includes the computer 1102 having processing unit(s) 1104 (also referred to as microprocessor(s) and processor(s)), a computer-readable storage medium such as a system memory 1106 (computer readable storage medium/media also include magnetic disks, optical disks, solid state drives, external memory systems, and flash memory drives), and a system bus 1108. The processing unit(s) 1104 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 1102 can be one of several computers employed in a datacenter and/or computing resources (hardware and/or software) in support of cloud computing services for portable and/or mobile computing systems such as cellular telephones and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 1106 can include computer-readable storage (physical storage) medium such as a volatile (VOL) memory 1110 (e.g., random access memory (RAM)) and non-volatile memory (NON-VOL) 1112 (e.g., ROM, EPROM, EEPROM, etc.). A basic input/output system (BIOS) can be stored in the non-volatile memory 1112, and includes the basic routines that facilitate the communication of data and signals between components within the computer 1102, such as during startup. The volatile memory 1110 can also include a high-speed RAM such as static RAM for caching data.

The system bus 1108 provides an interface for system components including, but not limited to, the system memory 1106 to the processing unit(s) 1104. The system bus 1108 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1102 further includes machine readable storage subsystem(s) 1114 and storage interface(s) 1116 for interfacing the storage subsystem(s) 1114 to the system bus 1108 and other desired computer components. The storage subsystem(s) 1114 (physical storage media) can include one or more of a hard disk drive (HDD), a magnetic floppy disk drive (FDD), solid state drive (SSD), and/or optical disk storage drive (e.g., a CD-ROM drive DVD drive), for example. The storage interface(s) 1116 can include interface technologies such as EIDE, ATA, SATA, and IEEE 1394, for example.

One or more programs and data can be stored in the memory subsystem 1106, a machine readable and removable memory subsystem 1118 (e.g., flash drive form factor technology), and/or the storage subsystem(s) 1114 (e.g., optical, magnetic, solid state), including an operating system 1120, one or more application programs 1122, other program modules 1124, and program data 1126.

The operating system 1120, one or more application programs 1122, other program modules 1124, and/or program data 1126 can include entities and components of the system 100 of FIG. 1, entities and components of the system 200 of FIG. 2, entities of the board 300 of FIG. 3, the tile image 400 of FIG. 4, the background image 500 of FIG. 5, the ink image 600 of FIG. 6, the final image 700 of FIG. 7, the set of features 110 of FIG. 8, and the methods represented by the flowcharts of FIGS. 9 and 10, for example.

Generally, programs include routines, methods, data structures, other software components, etc., that perform particular tasks or implement particular abstract data types. All or portions of the operating system 1120, applications 1122, modules 1124, and/or data 1126 can also be cached in memory such as the volatile memory 1110, for example. It is to be appreciated that the disclosed architecture can be implemented with various commercially available operating systems or combinations of operating systems (e.g., as virtual machines).

The storage subsystem(s) 1114 and memory subsystems (1106 and 1118) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) can be any available media (medium) that do (does) not employ propagated signals, can be accessed by the computer 1102, and includes volatile and non-volatile internal and/or external media that is removable or non-removable. For the computer 1102, the various types of storage media accommodate the storage of data in any suitable digital format. It should be appreciated by those skilled in the art that other types of computer readable medium can be employed such as zip drives, magnetic tape, flash memory cards, flash drives, cartridges, and the like, for storing computer executable instructions for performing the novel methods of the disclosed architecture.

A user can interact with the computer 1102, programs, and data using external user input devices 1128 such as a keyboard and a mouse, as well as by voice commands facilitated by speech recognition. Other external user input devices 1128 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1102, programs, and data using onboard user input devices 1130 such a touchpad, microphone, keyboard, etc., where the computer 1102 is a portable computer, for example.

These and other input devices are connected to the processing unit(s) 1104 through input/output (I/O) device interface(s) 1132 via the system bus 1108, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1132 also facilitate the use of output peripherals 1134 such as printers, audio devices, camera devices, and so on, such as a sound card and/or onboard audio processing capability.

One or more graphics interface(s) 1136 (also commonly referred to as a graphics processing unit (GPU)) provide graphics and video signals between the computer 1102 and external display(s) 1138 (e.g., LCD, plasma) and/or onboard displays 1140 (e.g., for portable computer). The graphics interface(s) 1136 can also be manufactured as part of the computer system board.

The computer 1102 can operate in a networked environment (e.g., IP-based) using logical connections via a wired/wireless communications subsystem 1142 to one or more networks and/or other computers. The other computers can include workstations, servers, routers, personal computers, microprocessor-based entertainment appliances, peer devices or other common network nodes, and typically include many or all of the elements described relative to the computer 1102. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1102 connects to the network via a wired/wireless communication subsystem 1142 (e.g., a network interface adapter, onboard transceiver subsystem, etc.) to communicate with wired/wireless networks, wired/wireless printers, wired/wireless input devices 1144, and so on. The computer 1102 can include a modem or other means for establishing communications over the network. In a networked environment, programs and data relative to the computer 1102 can be stored in the remote memory/storage device, as is associated with a distributed system. It will be appreciated that the network connections shown are exemplary and other means of establishing a communications link between the computers can be used.

The computer 1102 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    an imaging processing system that provides an image of a detected quadrangular object having a marking surface;
    a feature system that obtains a set of features related to image capture of the quadrangular object for detection of a background image and a foreground image of the marking surface;
    a classification component that performs classification of the quadrangular object based on the features to determine if the quadrangular object is a markable board; and
    a microprocessor that executes computer-executable instructions associated with at least one of the image processing system, feature system, or classification component.

2. The system of claim 1, further comprising a tiling component that subdivides the image of the quadrangular object into tiles, the size of which is optimized based on a color uniformity property and non-marked area property.

3. The system of claim 1, further comprising an estimation component that estimates the background image using spatial interpolation.

4. The system of claim 1, further comprising a differentiation component that differentiates a mark on the marking surface from the background image.

5. The system of claim 1, further comprising an image enhancement component that creates a new image and, enhances color uniformity of the background image and enhances clarity of marks in the foreground image in the new image based on the quadrangular object being a markable board.

6. The system of claim 1, wherein the classification component employs a machine learning classifier that processes the set of features to determine if the quadrangular object is a markable board.

7. The system of claim 1, wherein the classification component classifies the marking surface as a whiteboard based on features that distinguish the whiteboard from other quadrangular objects.

8. The system of claim 1, wherein the set of features include distance of the imaging system to the quadrangular object based on an auto-focus subsystem of a camera and estimated stroke width of a mark on the marking surface.

9. A method performed by a computer system executing machine-readable instructions, the method comprising acts of:
    receiving an image of a detected quadrangular object having a marking surface;
    processing features obtained as related to image capture of the quadrangular object for detection of a background image and a foreground image of the marking surface;
    performing classification of the quadrangular object based on the features, using a machine learning system;
    computing if the quadrangular object is a markable board based on the classification; and
    configuring a processor to perform at least one of the acts of receiving, processing, performing, or computing.

10. The method of claim 9, further comprising an act of estimating color of the background image by subdividing the image of the marking surface into tiles of a size that exhibit a color uniformity property and non-marked area property.

11. The method of claim 9, further comprising an act of applying a binary threshold algorithm that discerns marks on the marking surface from the background color.

12. The method of claim 9, further comprising an act of computing that the quadrangular object is a whiteboard.

13. The method of claim 9, further comprising an act of computing a feature that is distance to the quadrangular object to a device that captures the image based on parameters related to auto-focusing of the device.

14. The method of claim 9, further comprising an act of computing a feature that estimates a stroke length of a mark in an ink image.

15. The method of claim 9, further comprising an act of creating a new image of the quadrangular object for image enhancement.

16. The method of claim 15, further comprising an act of enhancing the new image to view marks in the foreground image.

17. A method performed by a computer system executing machine-readable instructions, the method comprising acts of:
    receiving an image of a quadrangular object having a marking surface and marks on the marking surface;
    estimating a background image based on the marking surface and the marks based on a uniformity of color over entirety of the marking surface;
    differentiating luminance of the marks from the color of the background image;
    obtaining features as related to image capture of the quadrangular object to differentiate the quadrangular object from other quadrangular objects;
    performing classification of the quadrangular object based on processing of the features using a machine-learning classifier;

computing if the quadrangular object is a whiteboard based on the classification; and configuring a processor to perform at least one of the acts of receiving, estimating, differentiating, obtaining, performing, or computing.

18. The method of claim 17, further comprising enhancing uniformity in the color of the background image and according to a base color of the whiteboard, and boosting saturation of the marks in a foreground image for clarity.

19. The method of claim 17, further comprising creating an enhanced image, copying a pixel from the image when a mask pixel is white and using a constant color when the mask pixel is black.

20. The method of claim 17, further comprising processing features related to camera orientation relative to the quadrangular object, camera distance from the quadrangular object, and estimated stroke width of the marks.

* * * * *